US008761369B2

(12) United States Patent
Terpstra et al.

(10) Patent No.: US 8,761,369 B2
(45) Date of Patent: Jun. 24, 2014

(54) CENTRAL SERVICES HUB FOR A TELECOMMUNICATIONS NETWORK

(75) Inventors: Richard Dean Terpstra, Superior, CO (US); David Allen Tschirhart, Dale, TX (US); Matthew Abram Karp, Tulsa, OK (US); Michael Jared Officer, Broken Arrow, OK (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 13/619,532

(22) Filed: Sep. 14, 2012

(65) Prior Publication Data

US 2014/0079206 A1    Mar. 20, 2014

(51) Int. Cl.
*H04M 7/00* (2006.01)
*H04M 3/42* (2006.01)
*H04L 12/66* (2006.01)

(52) U.S. Cl.
USPC ............ 379/220.01; 379/201.01; 379/201.05; 379/221.01; 379/221.02; 370/352

(58) Field of Classification Search
USPC ............... 379/220.01, 88.17, 221.14, 114.24, 379/219, 221.02, 221.01, 212.01, 201.01, 379/201.02, 201.05; 370/352
See application file for complete search history.

(56) References Cited

U.S. PATENT DOCUMENTS

| 6,243,444 | B1* | 6/2001 | O'Neal | 379/88.17 |
| 8,284,765 | B1* | 10/2012 | Kell et al. | 370/352 |
| 2008/0279354 | A1* | 11/2008 | Terpstra et al. | 379/114.24 |
| 2009/0074174 | A1* | 3/2009 | Allen et al. | 379/221.14 |
| 2012/0314701 | A1* | 12/2012 | Kell et al. | 370/352 |

OTHER PUBLICATIONS

International Search Report, dated Oct. 7, 2013, Int'l Appl. No. PCT/US13/059785, Int'l Filing Date Sep. 13, 2013; 4 pgs.
Written Opinion of the International Search Authority, dated Oct. 7, 2013, Int'l Appl. No. PCT/US13/059785, Int'l Filing Dated Sep. 13, 2013; 6 pgs.

* cited by examiner

*Primary Examiner* — Thjuan K Addy

(57) ABSTRACT

Implementations of the present disclosure involve an apparatus, system and/or method for a central hub of a telecommunications network to provide varying services for a received communication intended for varying telecommunications networks. In one embodiment, the central service hub receives the communication and provides the varying services for the communication based on information concerning the communication, such as the intended telecommunication network. In another embodiment, the central service hub analyzes the communication and determines to which telecommunications network the communication should be routed to apply the appropriate network services. The central service hub may comprise a softswitch, media gateway controller device or other telecommunications device that includes programming, such as an application programming interface (API), configured to receive and process the incoming communications.

20 Claims, 6 Drawing Sheets

CENTRAL SERVICES HUB FOR A TELECOMMUNICATIONS NETWORK

TECHNICAL FIELD

Aspects of the present disclosure relate to telecommunication networks. More particularly, aspects of the present disclosure involve an apparatus, system and method for consolidating access to services provided by separate telecommunication networks through a common access point or central component of the network.

BACKGROUND

Telecommunication networks provide for the transmission of information across some distance through terrestrial, wireless or satellite communication networks. Such communications may involve voice, data or multimedia information, among others. In a typical telephony-based communication network, a long-distance voice communication is received at a local exchange carrier (LEC), transmitted to a long-distance carrier and terminated at another LEC at the destination. For example, a prior telecommunication network is depicted in FIG. 1. In this example, a communication is initiated or originates at a local telephonic device, indicated in FIG. 1 as telephone 102. The originating LEC 104 connected to the local telephonic device 102 routes the communication to one of possibly several long-distance carrier networks associated with the LEC. Typically, the long-distance carrier selected to transmit the communication is associated with the telephone number of the local telephonic device from which the communication originates.

For example, the originating LEC 104 may maintain a database of connected telephone numbers and associates a long-distance network with the numbers for routing of long-distance communications. Thus, when a long-distance communication is received by the LEC 104, the database is accessed to determine which available long-distance network to transmit the communication. As such, a long-distance communication made from one device connected to the originating LEC 104 may be routed to network A (106), while another long-distance communication made from a separate device connected to the originating LEC may be routed to long-distance network B (108) for handling. While only two long-distance networks are shown in FIG. 1, any number of long-distance networks may be connected to the originating LEC 104 to handle long-distance communications originating from the one or more devices associated with the LEC.

To associate the originating device with a long-distance carrier, the LEC 104 associates a carrier identification code (CIC) with the incoming communication. The CIC identifies the long-distance network that will handle the communication. With this information, the originating LEC 104 routes the long-distance communication to the corresponding long-distance network. The long-distance network then routes the communication through the network to a receiving LEC 110 that completes the connection to the receiving telephonic device 112.

Differences in the long-distance networks make the routing of a long-distance communication to the proper network important. For example, each network may provide different service packages to the customers of that particular network for long-distance communications. More particularly and for example, network A may provide toll-free services that differ from services offered by network B. In addition, each network may provide varying billing pricing and procedures for long-distance communications transmitted through the network. Further, each network may utilize different communication platforms or protocols such that a communication transmitted by network A is in a different transmission format than a communication transmitted by network B. Also, because of the different formats utilized, the networks may differ in the type of communication devices that comprise the networks, as such devices are typically format specific.

However, in some instances, it may be desirous to transmit a communication through a network not indicated by the CIC associated with the communication. For example, a long-distance network may not be directly connected to a particular LEC such that the network cannot provide long-distance services to potential customers connected to the LEC. In another example, a long-distance carrier may own two or more networks that are connected to a single LEC, such that redundant components are included at the LEC for that carrier. In addition, a carrier may desire that all long-distance communications for each network owned by that carrier be routed through one particular network, for cost and efficiency reasons. Hence, among other things, there exists a need for method and system for flexibility in the processing of a communication intended for a first network by another network's components.

SUMMARY

One implementation of the present disclosure may take the form of a method for transmitting a long distance communication. The method may include the operation of receiving a long distance communication originating from a communication device associated with a first telecommunications network, the long distance communication including information associating the long distance communication with a second telecommunications network. In addition, the method may include applying one or more services to the long distance communication, the one or more services associated with the second telecommunications network, applying routing information to the long distance communication, the routing information configured to route the long distance communication to the second telecommunications network and transmitting the long distance communication to the second telecommunications network utilizing the routing information.

Another implementation of the present disclosure may take the form of a system transmission of long distance communications. The system may comprise a central service hub connected to a local exchange carrier, a first long distance network and a second long distance network. The central service hub may comprise a processor and a computer-readable device associated with the processor. The computer-readable device includes one or more instructions stored thereon and executable by the processor that cause the central service hub to receive a first long distance communication from the local exchange carrier, the first long distance communication including information associating the first long distance communication with the first long distance network and apply a first set of services to the first long distance communication, the first set of services associated with the first telecommunications network. The central service hub may also receive a second long distance communication from the local exchange carrier, the second long distance communication including information associating the second long distance communication with the second long distance network and apply a second set of services to the second long distance communication, the second set of services associated with the second telecommunications network.

DETAILED DESCRIPTION

Figure 1:
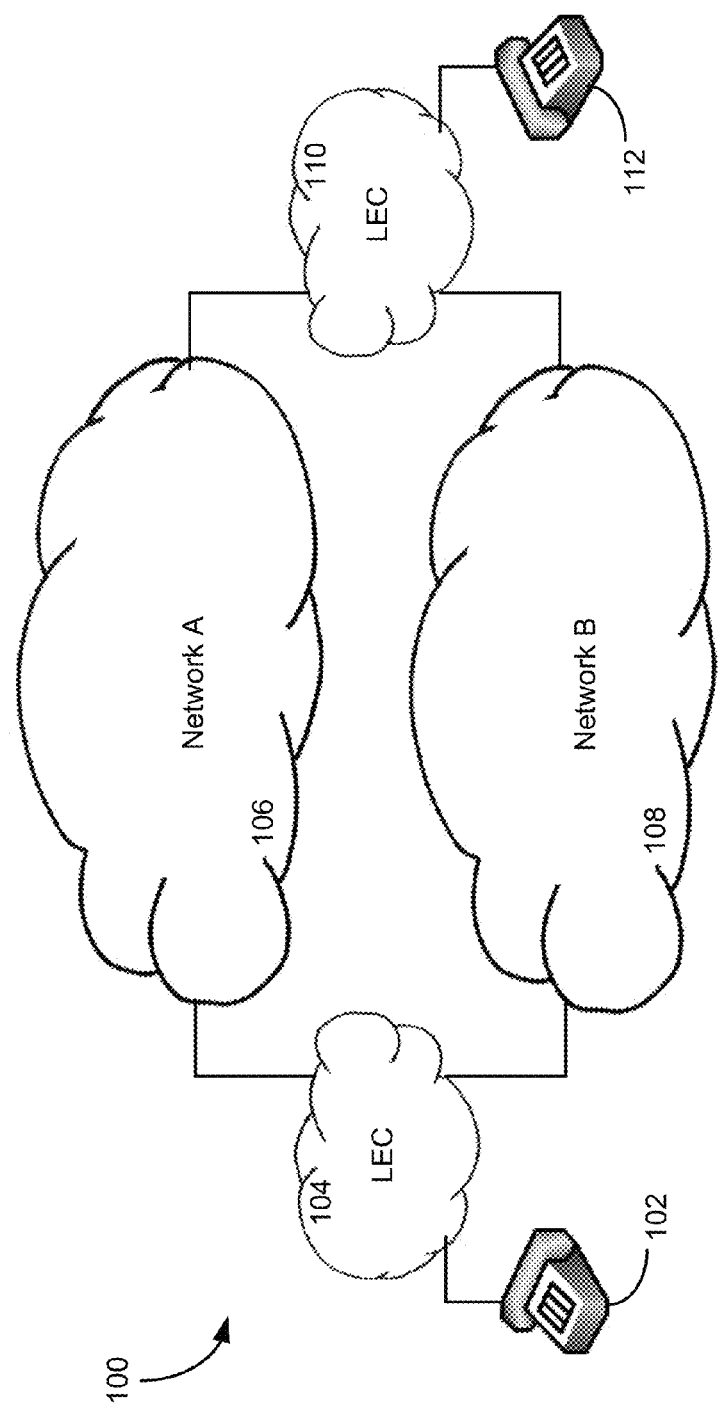
FIG. 1 is a diagram illustrating a prior art telecommunications network configuration including separate long-distance networks.

Implementations of the present disclosure involve an apparatus, system and/or method for a common access point or central hub for a telecommunications network to provide varying services for a received communication intended for various possible different telecommunications networks. In one embodiment, the central service hub receives the communication and provides the appropriate services for the communication based on information concerning the communication, such as the intended telecommunication network. In another embodiment, the central service hub analyzes the communication and determines to which telecommunications network the communication should be routed to apply the appropriate network services. The central service hub may comprise a softswitch, media gateway controller device, an application server or other telecommunications device that includes programming, such as an application programming interface (API), configured to receive and process the incoming communications. Based on information gleaned from an analysis of the incoming communication, the central service hub provides one or more services to the communication or provides routing information to the communication to transmit the communication to an appropriate network. In this manner, one or more telecommunications networks are configured to route incoming communications to the central service hub, or otherwise query the hub. The central service hub can then provide services to the communication based on information associated with the incoming communication and/or route the communication to the appropriate network for the service application.

The use of a central service hub also allows for the reduction of redundant network services and components. For example, because communications intended for varying networks can be routed to the central service hub for processing, networks are not required to provide hardware components from originating device to terminating device of the communication. Rather, several networks may utilize a single connection to the originating device and, instead, connect to the central service hub to receive and process the communications. In addition, the central service hub may provide services of several varying networks, relieving some telecommunication networks from the receiving and processing every communication intended for that network. Rather, the telecommunication network may obtain customers in locations not serviced by the network and provide their services through an existing network and central service hub. The central service hub may also eliminate redundant services provided by two or more networks as such services are handled by the central service hub rather than providing two networks that perform the same function. As such, the central service hub described herein provides for a common access point for communications of a plurality of telecommunications networks to more efficiently route and process the services associated with the communications.

Figure 2:
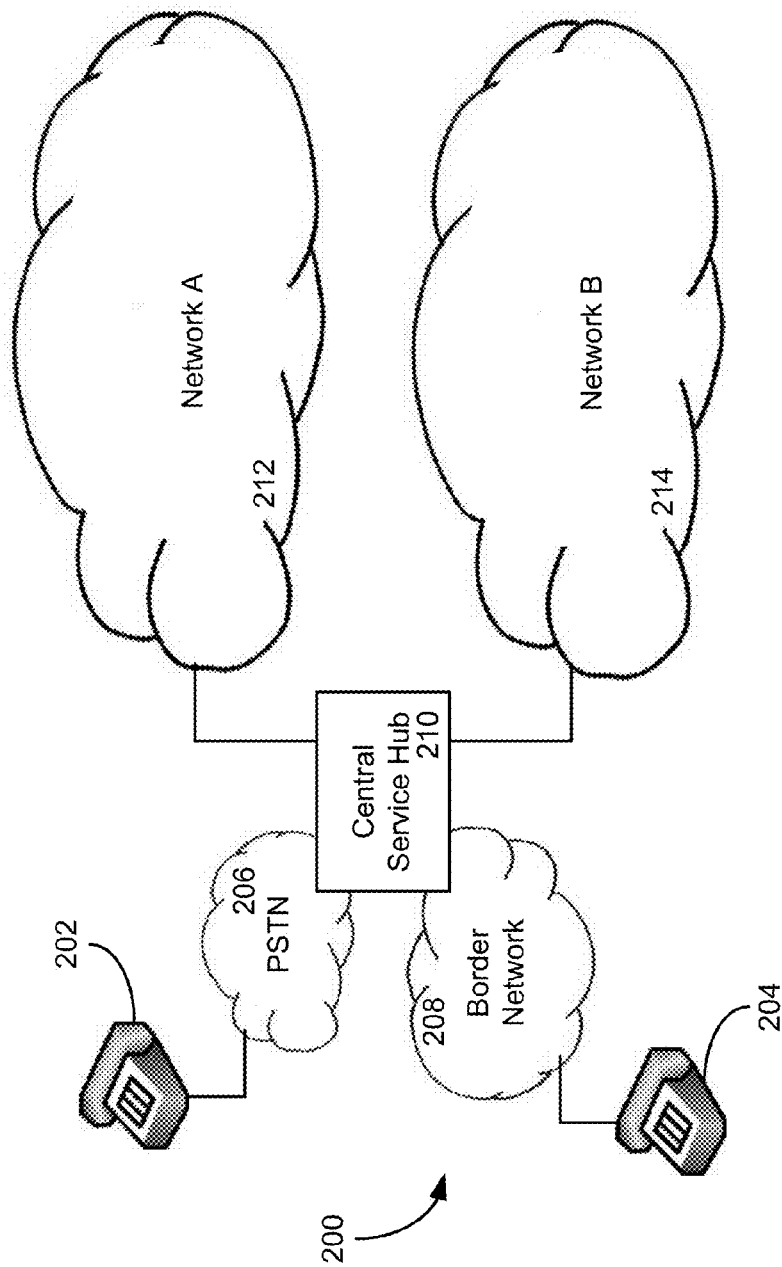
FIG. 2 is a diagram illustrating the originating portion of a telecommunications network utilizing a central service hub to provide services of a plurality of networks through the common access point.

FIG. 2 is a diagram illustrating the originating portion of a telecommunication network utilizing a central service hub to provide services for a plurality of networks through the common access point to the networks. The network configuration 200 of FIG. 2 is but one example of an originating configuration of a telecommunication network that utilizes a central service hub for processing incoming communications for one or more networks. Variations of such configurations are discussed below in detail, but one of ordinary skill in the art will recognize that many other configurations of the components of the telecommunication network may be utilized to accomplish the methods and systems described herein.

As explained above, a communication, either local or long-distance, may originate at a telephonic device connected to a local exchange carrier. Telephonic devices (202, 204) of FIG. 2 represent any number and type of communication devices that may originate a communication for the telecommunication network. For example, telephonic device (202, 204) may include a land-based telephone, a cell phone, a computer, a wireless computer device, a personal digital assistant, and the like. In general, any device from which a voice or data communication originates is summarized by the telephonic devices (202, 204) of FIG. 2.

The telephonic devices (202, 204) of FIG. 2 are connect to one or more local networks (206, 208) that are configured to connect the communication within the local network to another connected communication device or to one or more long-distance networks (212, 214). As used herein, the term "connected to" is used to mean any type of coupling whereby information can be passed between two or more components, including wired and/or wireless communication. In one example, the components may be directly connected as indicated in FIG. 2. In another example, one or more additional components and devices of the network may be connected between the components shown. In general, any connection point shown in FIG. 2 may include any type of direct connection or indirect connection of a telecommunications network. Further, local networks (206, 208) can be any network capable of connecting one or more communication devices (202, 204) for communication between the devices or with a long-distance network (212, 214) for communication with a remotely located device. In general, local networks (206, 208) can include border networks, Wi-Fi points, Internet Service Provider (ISP) networks, public switched telephone networks (PSTN), enterprise networks, virtual private networks (VPN), and/or the like.

The network of FIG. 2 may also include a central service hub device 210. In particular, one or more of the border networks may be connected to the central service hub 210 for transmission of a communication to the central hub. In one embodiment, the central service hub 210 is an IP media gateway device that is configured or programmed to process incoming communications as explained herein. An IP media gateway can be any microprocessor based machine used to control and/or connect the border of an IP network and an adjoining network. In another embodiment, the central service hub 210 is a softswitch device that is configured to process incoming communications as explained below. More particularly, the central service hub 210 functions may be implemented in a device that also provides the softswitch functionality for a network. In general, the central service hub 210 is a telecommunication networking device that is programmed or otherwise configured to perform the functions described herein for incoming long-distance communications. Central service hub 210 also provides a gateway or interface between the local networks (206, 208) and one or more long-distance networks (212, 214). As explained in more detail below, the central service 210 may be separate from or a part of the long-distance networks (212, 214).

One or more long-distance networks (212, 214) may be connected to the central service hub 210 for receiving long-distance communications that originate from one or more of the telephonic devices (202, 204). Although two long-distance networks (212, 214) are shown in FIG. 2, any number of such networks may be connected to, or otherwise associated with, the central service hub 210. Further, although the networks (212, 214) of FIG. 2 are shown as distinct networks, it should be appreciated that some components of the networks may overlap or be shared between the networks. In addition, network A (212) and network B (214) may be any known type or hereafter developed telecommunication network, including a voice over IP (VOIP) communications network or packet-switched network. In general, the networks (212, 214) may include one or more routers and switches capable of routing various transmissions across the network. Long distance communications or transmissions originating/terminating at a local carrier may be transmitted through the networks (212, 214) to a remotely located communication device. As such, although not shown in FIG. 2, one or more local networks and telephonic devices may also be connected to the long-distance networks (212, 214) to receive communications that are transmitted through the central service hub 210.

Figure 3:
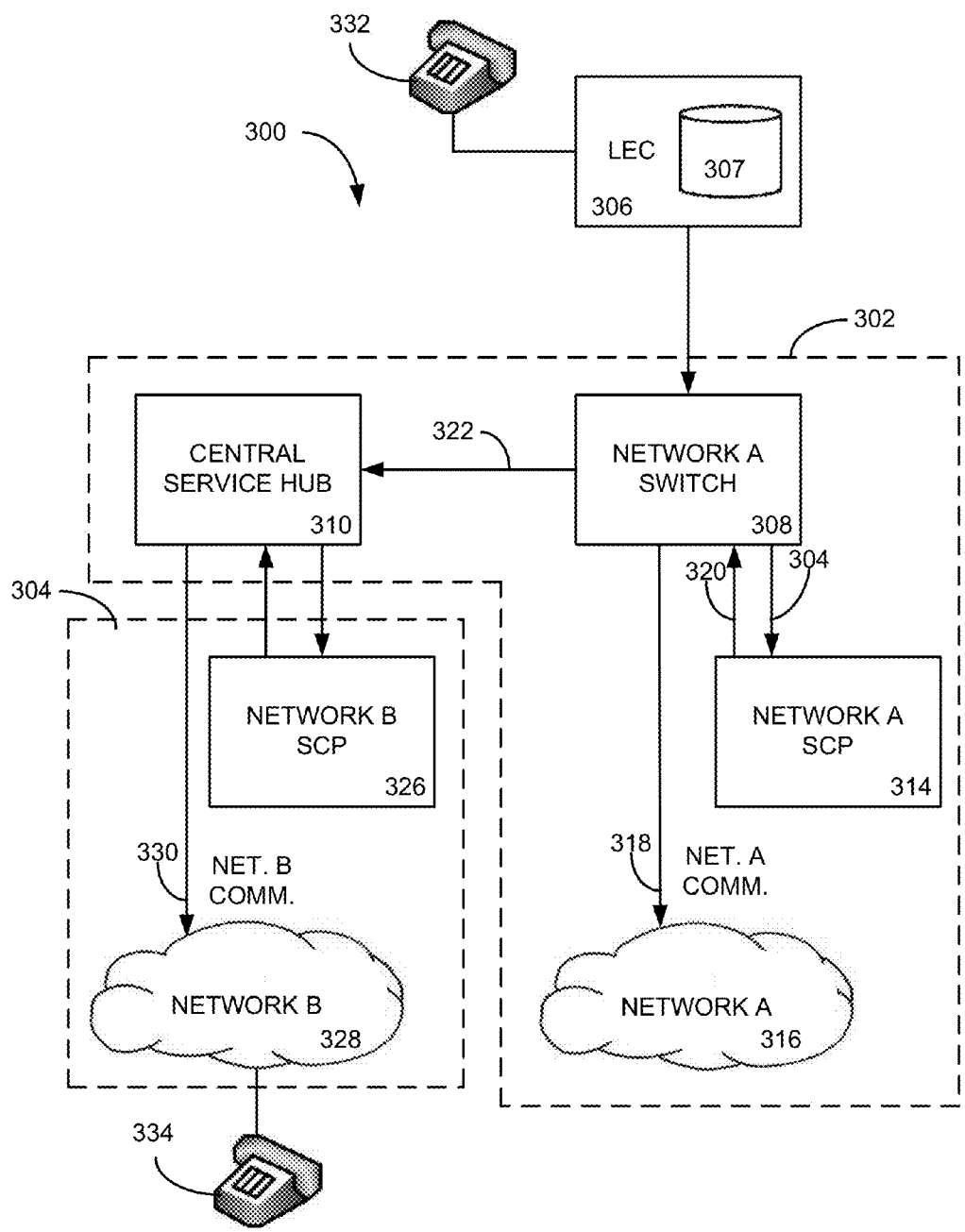
FIG. 3 is a diagram illustrating a first embodiment of a telecommunication network configured to route a communication through one of a plurality of networks utilizing the central service hub.

FIG. 3 is a diagram illustrating a first embodiment 300 of a telecommunication network configured to route a communication through one of a plurality of networks utilizing the central service hub. Through the embodiment shown in FIG. 3, communications intended for network A and network B may be transmitted to the network A system 302 first and handled by the central service hub 310 for the application of network-specific services, regardless of which network the communication is intended. Thus, through the configuration of FIG. 3, network system B 304 is not required to provide a trunk or other communication connection to the local network 306 to properly process a communication intended for network B and provide network B specific services to the communication.

Similar to the network described above, a local network 306, designated as the LEC, may be connected to a telecommunications network, such as the network system A (302). A communication originating at a device 332 connected to the LEC 306 is first processed by the LEC. In particular, the LEC 306 may utilize a database 307 to associate the communication (e.g. a phone call) with a telecommunication network (e.g. a specific long-distance carrier). In particular, the LEC 306 associates a carrier identification code (CIC) with the incoming communication that identifies to which network the communication is routed. With this information, the LEC 306 transmits the communication to network system A 302. However, it should be appreciated that the LEC 306 may transmit the communication to any network connected to the LEC. Thus, although not shown, any number of networks may be connected to the LEC for receiving communications from the LEC.

One advantage provided by a system that utilizes the central service hub 310 of FIG. 3 is the feature of routing communications intended for a specific network through a separate network. For example, network system A 302 is shown connected to the LEC 306, while network system B 304 is not directly connected to the LEC. However, utilizing the central service hub 310, the LEC 306 may be configured to transmit communications intended for network system B 304 through network system A 302. More particularly, the database 307 of the LEC 306 may be updated or configured to assign a network system A 302 CIC to communications intended for network system B 304. Thus, as a communication intended for network system B 304 is detected at the LEC 306, the LEC may assign a CIC to that communication that routes the communication first to network system A 302 for processing.

Communications transmitted from the LEC 306 may be received at the network A switch 308. The network A switch 308 may be any type of telecommunication switch. In one example, the network A switch may be a Digital Multiplex System (DMS) type switch. The network A switch 308 may then query a network A service control point (SCP) 314, as indicated by communication flow arrow 304, for all received communications to the network. In general, the network A SCP 314 is a networking device that applies one or more services to the communication and provides routing information to the network A switch 308 based on the SCP programming. As used herein, the SCP may be a service control point for a circuit switch network or part of a next generation packet switch network. For example, the SCP may be an application server or routing engine. The network A SCP 314 in FIG. 3 may, for all network A communications, identify the originating device and destination device of the communication and apply services to the communication accordingly. For example, for a toll-free communication, the network A SCP 314 may play a voice message or prompt the caller for additional information to further process the communication. Other services include, but are not limited to time of day, day of week, day of year routing, load balancing across multiple data access layers, point of origination, overflow to a POTS network and interactive voice response menu routing. In addition, the network A SCP 314 may provide routing information 320 to the communication based on the information received concerning the communication. For example, network A SCP 314 may determine that the communication is intended for network A 316. In response, network A SCP 314 may then provide routing information 320 to the network A switch 308 to transmit the communication to the remaining portion of network A 316 for propagation to the communication destination, as indicated in FIG. 3 by communication flow arrow 318.

Network A SCP 314 may also be programmed to recognize communications received that are not intended for that particular network. For example, network A SCP 314 may receive a communication intended for transmission through network system B 304. In this situation, network A SCP 314 may provide routing information for the communication back to the network A switch, as indicated by communication flow arrow 320. In addition, network A SCP 314 may associate additional information to the network B communication that instructs network A switch 308 to route the communication to the central service hub 310. Thus, upon receiving the network B communication, the network A switch 308 routes the communication to the central service hub 310, as indicated by communication flow arrow 322. Although shown in FIG. 3 as being directed to the central service hub 310 from the network A switch 308, it is not required that communication from the network A switch to the central service hub be direct. For example, in another implementation, network A switch 308, upon receiving a network B communication or any communication not recognized by the network A switch, may return the call back to the LEC 306 or other ingress component. The LEC 306 may then route the communication to the central service hub 310. Thus, communication flow arrow 322 represents any communication from the network A switch 308 to the central service hub 310 through any number of components shown or not shown in FIG. 3. Further, any number of additional routing tables or engines may be employed by any number of the components of the network to aid in the proper routing of the communication.

Upon receipt of a communication intended for network system B 304, the central service hub 310 may take several actions. In one example, the central service hub 310 may be programmed or otherwise configured to mirror an SCP of network system B 304 such that the proper services may be applied to the communication by the central service hub. Thus, based on the communication origination and destination and the services offered by network system B 304, services offered by network system B may be applied to the communication, even if such services differ than those offered by network system A 302. In another example, the central service hub 310 may query an SCP of network system B 304 (such as Network B SCP 326) to determine which services should be applied to a communication that has been received. Upon return from the network system B 304, the central service hub 310 may apply the received services to the communication. Also, information about the received communication may be archived or stored for billing purposes associated with the intended network for the communication. Thus, the central service hub 310 may note the type of communication, the time of day the communication was received, the network the communication is intended for, etc., and supply that information to a device of the intended network for billing purposes. Alternatively, the information may be stored by the central service hub 310 in a database and accessed later by a billing company for billing purposes.

In yet another example, the central service hub 310 may recognize the intended network system of the communication and route the communication accordingly without associating any services with the communication. In general, regardless of the action taken by the central service hub 310, the hub may then route the communication to network system B 304 (as shown by communication flow arrow 330) for transmission through network B and connection of the communication to a destination device 334. In the example shown in FIG. 3, the central service hub 310 queries the network B SCP 326 for routing information to further process the communication. Network B SCP 326 provides routing information to the central service hub 310 to route the communication to the remaining portion of network B 328, as indicated by communication flow arrow 330. In another example, the central service hub 310 may transmit the communication directly to the remaining portion of the network B 328. Thus, through the use of the central service hub 310, the telecommunication system of FIG. 3 may receive all communications intended for network system A and network system B through the components of network A while maintaining the proper services for the communication.

Although certain components of the embodiment 300 of FIG. 3 are illustrated, any number of telecommunications may be included in the processing and flow of the communication. For example, any number of additional routing components may be located between the LEC 306 and the network A switch 308. Similarly, any number of networking or routing components may be located between the network A switch 308 and the central service hub 310. Those of skill in the art will appreciate the complexity and variability of the telecommunication systems described. In another example, any number of network systems may be connected to, or otherwise associated with, the central service hub 310. Thus, a network system C, network system D and so on may also be connected to the central service hub 310 such that the communications intended for those networks may also be transmitted through network system A 302 from the LEC 306 and processed by the central service hub. In some examples, the additional network systems may include a connection to the LEC 306, but routing through the central service hub 310 may still occur for communications intended for those networks for application of the proper services to the communication.

Figure 4:
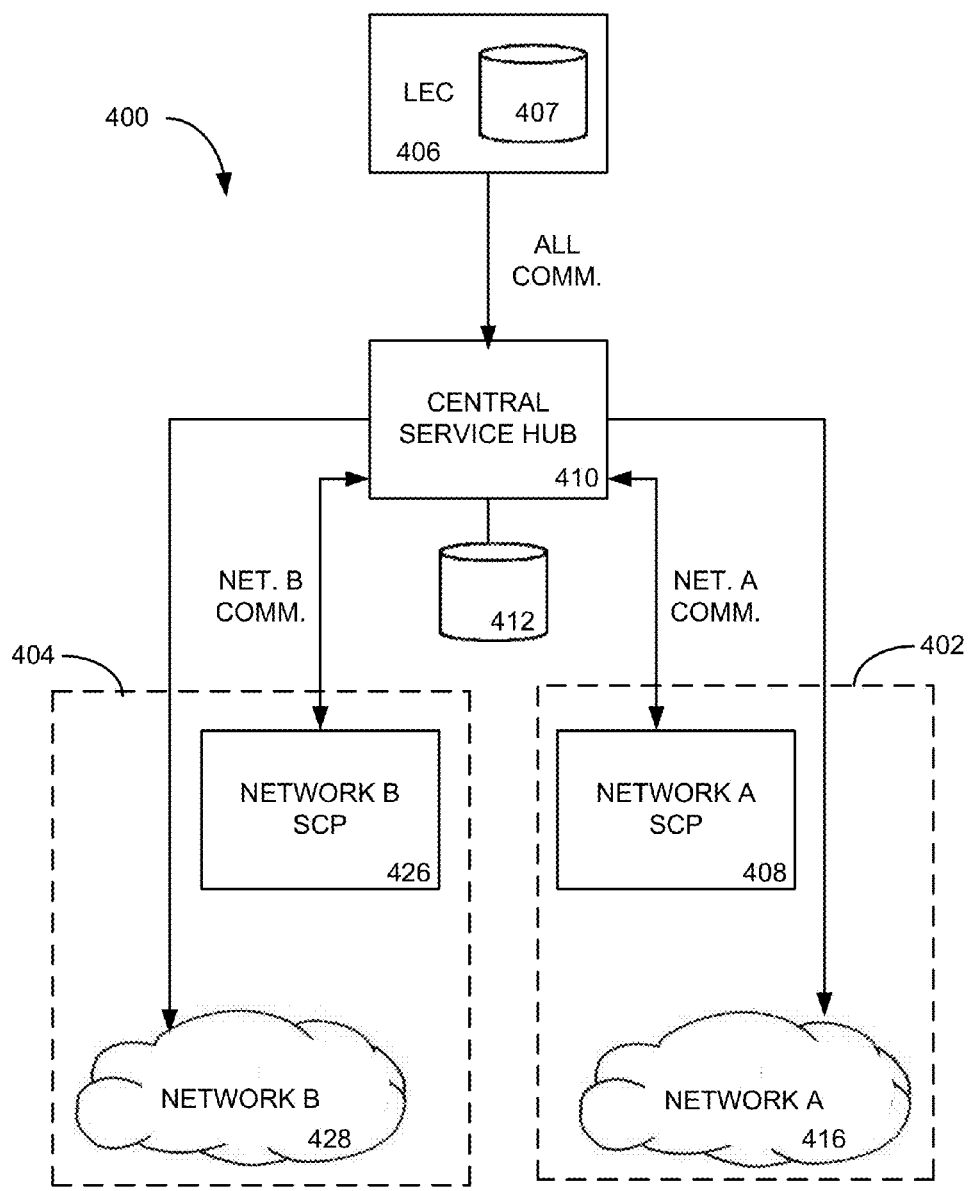
FIG. 4 is a diagram illustrating a second embodiment of a telecommunication network configured to route a communication through one of a plurality of networks utilizing the central service hub.

In an alternate embodiment shown in FIG. 4, all communications intended for the network systems connected to the central service hub 410 are routed through the central service hub. In the example shown in FIG. 3, communications for network system A 302 are processed by network system A directly without necessarily being routed through the central service hub 310. In the embodiment of FIG. 4, however, every communication is routed through the central service hub 410. Otherwise, the operations of the components of the embodiment of FIG. 4 are similar to the components described above with reference to FIG. 3. Thus, central service hub 410 may determine to which network system the communication is intended and apply the particular services to the communication and/or route the communication to the appropriate network system. More particularly, central service hub 410 may take any of the actions described above to process the communication based on the intended network system of the communication. For example, the central service hub 410, as well as other hubs discussed herein, may include a database 412 of the services offered for a particular network system such that the proper services may be applied to the communication by the central service hub based on the type of communication and other communication information. Thus, based on the communication origination and destination and the services offered by network system A 402, certain services may be applied to the communication. Similarly, central service hub 410 may include the services available to communications of network system B 404 and apply those services accordingly.

In another example, the central service hub 410 may query an SCP of either network system B 404 or network system A 402 to determine which services should be applied to a communication that has been received, based on the communication information. Upon return from the available services, the central service hub 410 may apply the received services to the communication. Also, the central service hub 310 may recognize the intended network system of the communication and route the communication accordingly without applying the available services. Rather, such services may be applied by an SCP (408, 426) of the respective network systems (402, 404) when the call is processed by the network systems. In yet another example, the central service hub 410 may perform all SCP duties for either network such that a routed communication bypasses the associated network SCP.

Additionally, the central service hub 410 device of the embodiment 400 of FIG. 4 may be a part of network system A 402, network system B 404 or may be separate from both network systems. Also, any number of network systems may be connected to or otherwise in communication with the central service hub 410 such that any number of network communications may be routed through and processed by the central service hub.

Through the use of the embodiments discussed herein, several advantages for processing a communication through one or more telecommunication networks may be achieved. For example, any network can utilize an existing connection to a local network to receive a communication and apply the appropriate services and billing for that communication and/or route the communication to the appropriate network for the application of the services, even if the existing connection is a part of a different network or maintained by a separate telecommunication provider. This can reduce the need for redundant connections and services offered by separate networks. In addition, a first telecommunication network with a connection to the local network may simply provide the services of a second network behind the scenes such that the participants of the communication are unaware that the communication is not processed by the second network. This may provide an additional revenue stream for the first network while providing uninterrupted service to the clients of the second network.

Further, the embodiments described herein provide flexibility in the processing of any communication. As mentioned above, telecommunication networks may utilize varying protocols for routing a communication, such that one network may use a first protocol, such as a time division multiplexing (TDM), while another network may use a second protocol, such as packet-switching. In addition, some services for a communication may be available for a particular protocol, but not others. Thus, through the use of a central service hub, services typically unavailable for a communication of one network may now be offered for users of that network. For example, network system A 402 may be a circuit-switch network and may offer only circuit-switch specific services. Thus, a network system that does not utilize the circuit-switch protocol may contract with network system A and the central service hub 410 to provide circuit-switch services to a communication and routing through network system A. In this manner, additional flexibility of the services offered to a communication and the network protocol used to process the communication may be provided by the user of the central service hub.

Figure 5:
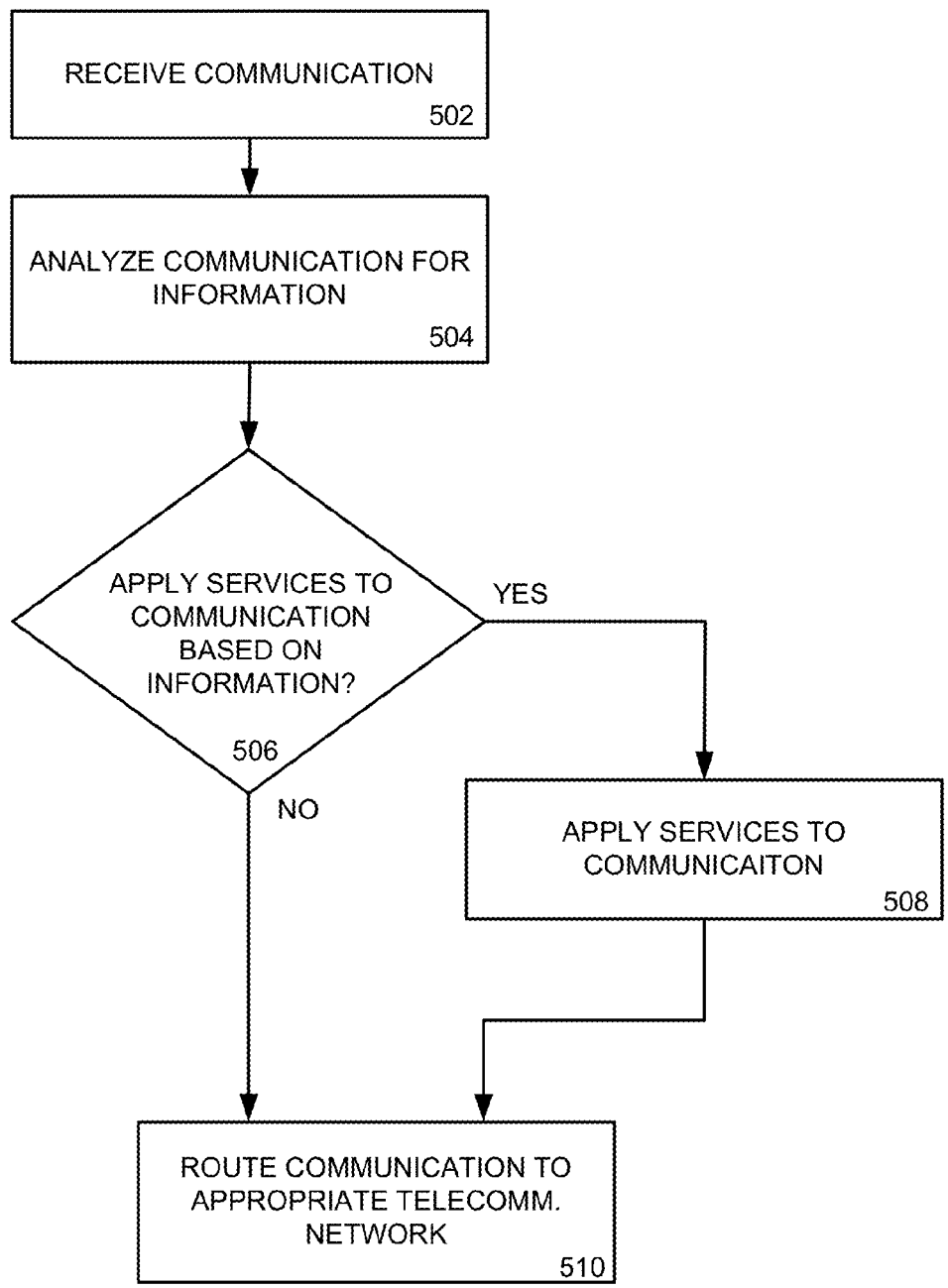
FIG. 5 is a flowchart of a method for a telecommunications network device to process communications through a common, shared access point to provide services of a plurality of networks.

FIG. 5 is a flowchart of a method for a telecommunications network device to process communications through a common, shared access point to provide services of a plurality of networks. In one embodiment, the operations of FIG. 5 may be performed by a central service hub component of a telecommunications network. Such a central service hub may include a softswitch, application server (sometimes known as a Serving Call Session Control Function (S-CSCF) or media gateway controller programmed to perform the operations described.

In operation 502, the central service hub may receive a communication from a telecommunication device. For example, the central service hub may receive the communication from a local network or from a long-distance telecommunications network. The communication may be any type of communication that is transmitted through a telecommunication network, such as a voice or data communication. A voice communication may include a toll-free communication or long-distance communication originated by a user at a telephonic device.

In operation 504, the central service hub may analyze the communication for information that may aid the central service hub in processing the communication. For example, the communication may include information indicating the originating device from which the communication was initiated, the destination device and the type of communication. Other information may also be included, including time of day the communication originated and information concerning the network through which the communication is to be transmitted. In general, any information about the communication may be included that may aid a telecommunication network in processing and properly routing the communication.

In operation 506, the central service hub may determine, based on the information obtained in operation 504, whether one or more services are to be applied to the communication. As discussed above, the central service hub may apply one or more services to a communication based on programmed operations within the hub, or may route the communication to a proper telecommunications network for application of the services to the communication. Thus, the central service hub may include or otherwise have access to a database that indicates the action to be taken for communications of the networks associated with the hub. Further, the central service hub may include one or more programs, as discussed in more detail below, for processing the communications based on the information stored in and obtained from the database. In one example, all communications intended for a first network may have services applied to the communication by the central service hub, based on the type and information obtained about the communication. Communications intended for a second network may be routed to the second network by the central service hub in response to one or more instructions stored in the central service hub or associated database.

If the central service hub determines in operation 506 that services are to be applied to the communication, the hub may apply such services in operation 508. Services applied to a communication may include customer determined services, call routing services, information gathering services and billing services. For example, for a toll-free communication, the central service hub may provide a recorded message and detect one or more telephone button selections made by the originator of the communication. In another example, the central service hub may note the type of communication, the time of day and the destination for the communication and provide such information to a billing system. Other services applied to the communication by the central service hub may be dependent on the information gathered, such as the type of communication and products previously purchased by the communication originator. In general, any service known or hereafter developed that may be applied to a communication of a telecommunication network for processing of the communication is envisioned being applied to the communication in operation 508.

If the central service hub determines in operation 506 that services are not to be applied to the communication, or after the services have been applied by the central service hub in operation 508, the central service hub may transmit the communication to the designated telecommunication network for further routing. The telecommunication network that receives the communication may be the network designated in the communication information, or may be an alternate network as determined by the central service hub. In general, any network connected to or associated with the central service hub may receive the communication in operation 510.

Figure 6:
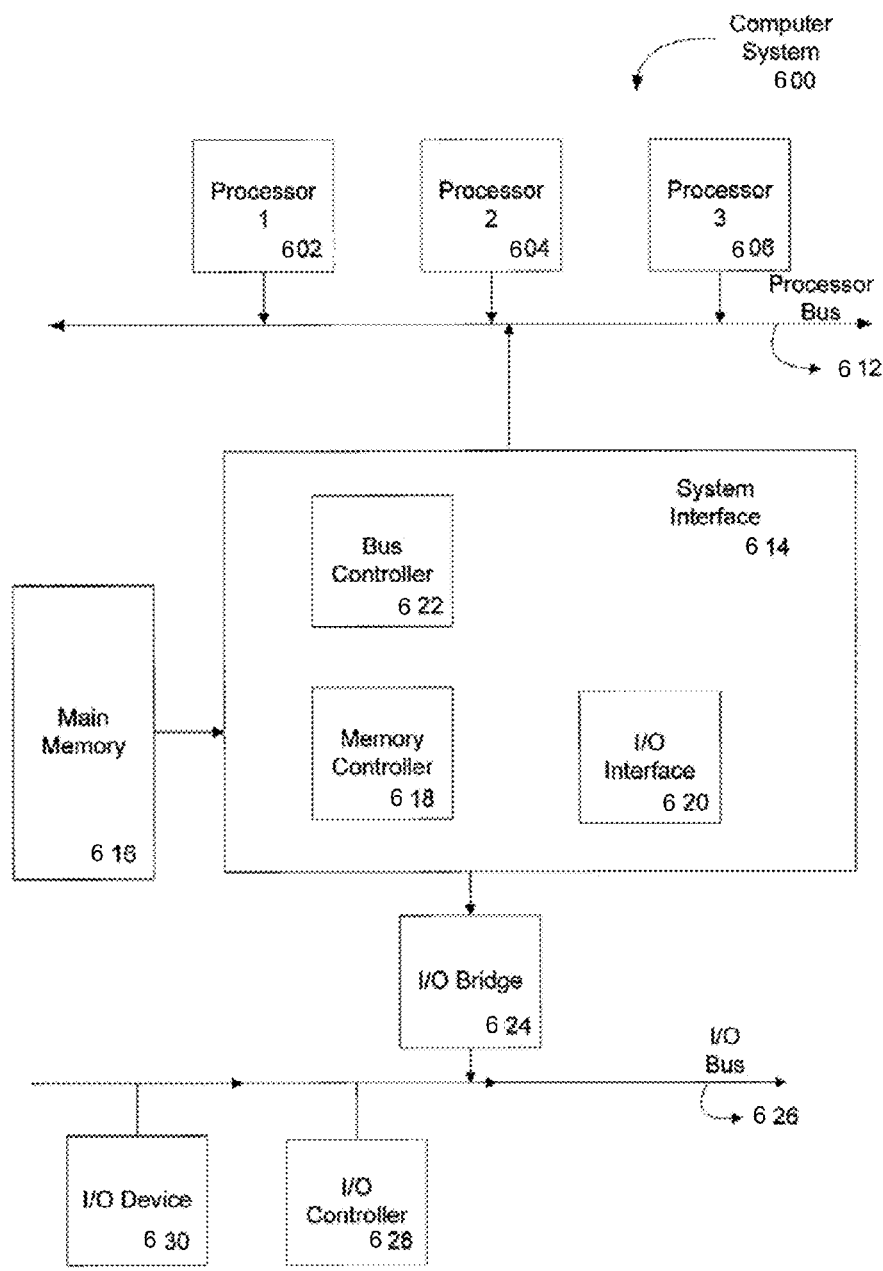
FIG. 6 is a block diagram illustrating an example of a computer system or softswitch which may be used in implementing embodiments of the present disclosure.

FIG. 6 is a block diagram illustrating an example of a central service hub or similar computer system 600 which may be used in implementing embodiments of the present disclosure. The central service hub or computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIG. 5 is illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for transmitting a long distance communication, the method comprising:
   receiving a long distance communication originating from a communication device associated with a first telecommunications network, the long distance communication including information associating the long distance communication with a second telecommunications network;
   applying one or more services to the long distance communication, the one or more services associated with the second telecommunications network, wherein the first set of services includes a time-based routing service;
   applying routing information to the long distance communication, the routing information configured to route the long distance communication to the second telecommunications network; and
   transmitting the long distance communication to the second telecommunications network utilizing the routing information.

2. The method of claim 1 further comprising:
   analyzing the long distance communication to obtain information about the long distance communication, including information identifying the second telecommunications network as a destination for the long distance communication.

3. The method of claim 1 wherein the first telecommunications network and the second telecommunications are distinct.

4. The method of claim 3 wherein the first telecommunications network operates on a first communication protocol and the second telecommunications network operates on a second communication protocol that is different than the first communication protocol.

5. The method of claim 1 further comprising:
   transmitting a request to a local network associated with the communication device, the request configured to instruct the local network to provide the long distance communication associated with the second telecommunications network to the first telecommunications network.

6. The method of claim 1 further comprising:
   querying a service control point device of the second telecommunications network to obtain the one or more services associated with the second telecommunications network; and receiving the one or more services from the service control point device of the second telecommunications network.

7. The method of claim 1 wherein the long distance communication is a toll-free communication and the one or more services comprise a voice recording associated with the toll-free communication.

8. The method of claim 1 wherein the one or more services comprise performing billing of the long distance communication for the second telecommunications network.

9. A system for transmission of long distance communications, the system comprising:
a central service hub connected to a local exchange carrier, a first long distance network and a second long distance network, the central service hub comprising:
a processor; and
a computer-readable device associated with the processor and including instructions stored thereon and executable by the processor to:
receiving a first long distance communication from the local exchange carrier, the first long distance communication including information associating the first long distance communication with the first long distance network;
applying a first set of services to the first long distance communication, the first set of services associated with the first telecommunications network, wherein the first set of services includes a time-based routing service;
receiving a second long distance communication from the local exchange carrier, the second long distance communication including information associating the second long distance communication with the second long distance network; and
applying a second set of services to the second long distance communication, the second set of services associated with the second telecommunications network.

10. The system of claim 9 wherein the instructions of the computer-readable device are further executable to:
apply first routing information to the first long distance communication, the first routing information configured to route the first long distance communication to the first telecommunications network; and
transmit the first long distance communication to the first telecommunications network utilizing the first routing information.

11. The system of claim 9 wherein the instructions of the computer-readable device are further executable to:
apply second routing information to the second long distance communication, the second routing information configured to route the second long distance communication to the second telecommunications network; and
transmit the second long distance communication to the second telecommunications network utilizing the second routing information.

12. The system of claim 9 wherein the central service hub is a component of the first long distance network.

13. The system of claim 9 wherein the central service hub is distinct from the first long distance network and the second long distance network.

14. The system of claim 9 wherein the central service hub comprises a softswitch, media gateway controller or an application server.

15. The system of claim 9 wherein the first telecommunications network operates on a first communication protocol and the second telecommunications network operates on a second communication protocol that is different than the first communication protocol.

16. The system of claim 9 wherein the instructions of the computer-readable device further cause the processor to:
query a service control point device of the first telecommunications network to obtain the first set of services associated with the first telecommunications network; and
receive the first set of services from the service control point device of the first telecommunications network.

17. The system of claim 9 wherein the first set of services comprises voice recording associated with the long distance communication requesting information from a communication originator.

18. The system of claim 17 wherein the second set of services comprises performing billing of the long distance communication for the second long distance network.

19. A method for transmitting a toll free communication through a network, the method comprising:
receiving a communication originating from a communication device associated with a first telecommunications network, the communication including information identifying the communication as toll free and associating the communication with a second telecommunications network;
applying one or more services to the communication, the one or more services associated with the second telecommunications network, wherein the one or more services includes a time-based routing service;
querying a service control point associated with the second telecommunications network to obtain routing information for the communication;
applying routing information to the communication, the routing information configured to route the communication to the second telecommunications network; and
transmitting the communication to the second telecommunications network utilizing the routing information.

20. The method of claim 19 wherein the central service hub is a component of the first telecommunications network.

* * * * *